United States Patent
VandenHeuvel et al.

(10) Patent No.: US 6,447,043 B1
(45) Date of Patent: Sep. 10, 2002

(54) VEHICLE CLOSURE ASSEMBLY WITH HINGE

(75) Inventors: Marinus T. VandenHeuvel, Penetanguishene; Rafael Perlin; Michael John Duffy, both of Midland, all of (CA)

(73) Assignee: M & C Corporation, Warren, MI (US)

( * ) Notice: Subject to any disclaimer, the term of this patent is extended or adjusted under 35 U.S.C. 154(b) by 0 days.

(21) Appl. No.: 09/757,518

(22) Filed: Jan. 9, 2001

(51) Int. Cl.[7] .............................................. B62D 25/10
(52) U.S. Cl. ............................ 296/76; 49/386; 16/128; 16/367; 16/353
(58) Field of Search ...................... 296/76, 96, 146.8, 296/146.11, 146.12; 16/353, 164, 367, 128, 308; 49/249, 383, 386

(56) References Cited

U.S. PATENT DOCUMENTS

| | | |
|---|---|---|
| 1,100,684 A | 6/1914 | Stoakes |
| 1,313,726 A | 8/1919 | Nicol |
| 1,887,549 A | 11/1932 | Ervin |
| 1,903,379 A | 4/1933 | Hall |
| 2,071,070 A | 2/1937 | Horst |
| 2,085,616 A | 6/1937 | Voge |
| 2,178,908 A | 11/1939 | Hudson |
| 3,956,793 A * | 5/1976 | Jewell ........................ 16/128.1 |
| 4,291,501 A * | 9/1981 | Steinberg et al. .............. 49/386 |
| 4,580,315 A * | 4/1986 | Beckwith ..................... 16/308 |
| 4,587,760 A * | 5/1986 | Brissette ...................... 49/386 |
| 4,692,964 A * | 9/1987 | Debruyn ...................... 16/367 |
| 5,050,270 A * | 9/1991 | Burgei et al. ................. 16/306 |
| 5,062,182 A * | 11/1991 | Griffiths et al. ............... 16/368 |
| 5,195,796 A * | 3/1993 | Wampler ..................... 296/76 |
| 5,493,880 A * | 2/1996 | Jang ............................ 16/353 |
| 5,544,449 A | 8/1996 | Amelio et al. |
| 5,557,829 A * | 9/1996 | Schoen et al. ................. 16/375 |
| 5,664,289 A * | 9/1997 | Wolda et al. .................. 16/308 |
| 5,758,389 A * | 6/1998 | Wolda .......................... 16/308 |
| 5,785,375 A * | 7/1998 | Alexander et al. .......... 296/108 |
| 5,967,586 A * | 10/1999 | Duffy et al. ................... 296/76 |
| 6,070,929 A * | 6/2000 | Barkley ......................... 296/76 |

FOREIGN PATENT DOCUMENTS

| | | | |
|---|---|---|---|
| CA | 2218777 | | 10/1997 |
| DE | 2229348 | | 12/1972 |
| DE | 3201522 | | 7/1983 |
| DE | 19629030 | * | 2/1997 |
| GB | 376624 | | 7/1932 |
| GB | 394767 | | 7/1933 |
| GB | 524143 | | 7/1940 |
| JP | 10236337 | * | 9/1998 |
| WO | PCT/CA98/00984 | | 10/1998 |
| WO | WO99/16658 | * | 4/1999 |

OTHER PUBLICATIONS

Jozefczak et al, Research Disclosure No. 330, 9110, pp. 826–828; XP000265081 Havant, GB, Oct. 1991.

Chironis, Mechanisms & Mechanical Devices Sourcebook, McGraw Hill, 1991, pp. 154–158.

1997 Service Manual, Pontiac & Buick GMP/97–WPB–1, published by North American Operations includes cover page and three pages from the manual.

\* cited by examiner

*Primary Examiner*—Ken Patel
(74) *Attorney, Agent, or Firm*—Brooks & Kushman P.C.

(57) ABSTRACT

A vehicle body closure assembly combines a hinge, that provides a plurality of pivot axes that are aligned with a common intersection point above a body opening closed by a closure panel hinged to the vehicle body, and a displacement limiter that controls the open position of the closure so that the hinge pieces maintain a stable alignment with respect to each other. Preferably, the hinge structure or adjacent supports include the displacement limiter. A panel mount defines a first hinge axis, a body mount defines a second axis and a pair of links are pivotally secured together between the panel mount and the body mount to complete a hinge set. Preferably, a pair of hinge sets are secured to the hinge side of the closure panel to align said panel for movement in a non-interfering path with respect to body portions adjacent the path.

23 Claims, 8 Drawing Sheets

VEHICLE CLOSURE ASSEMBLY WITH HINGE

TECHNICAL FIELD

The present invention relates to closure panel assemblies with a hinge concealed within the exterior of a vehicle body without obstructing interior space or the body opening providing access to the interior of the body.

BACKGROUND ART

Vehicle closures such as doors, hoods and trunk lids are often mounted by hinges that are hidden in order to avoid interference with vehicle body styling. However, the function and the structure of the hinge are often complicated by the fact that styling shapes of the closure panels, as well as the body panels adjacent the body opening closed by the panel, may be configured in a manner that does not match the direction of panel displacement, resulting in an interference unless a particularly complicated hinge mechanism can be employed to avoid the interference. Nevertheless, the need for special construction of each hinge structure depending upon the styling of the vehicle body reduces the efficiency of motor vehicle production.

Two types of hinges that have been used most prominently include gooseneck hinges and multiple bar hinges. The gooseneck hinges are often preferred since they provide simplicity and are not visible when the trunk is closed. Nevertheless, a gooseneck portion is mounted at each side of the lid and extends a substantial distance into the interior of the vehicle body. Thus, the pair of gooseneck hinge bars obstruct a large amount of room within the interior of the vehicle. Nevertheless, the pair of bars is necessary in order to properly align portions of the closure panel with the body opening and avoid interference with the rear window or other body area of the vehicle when the closure panel is open.

Alternatively, the four bar hinge system has been used for vehicle hoods and trunk lids. Multiple bar hinges are also invisible when the trunk is closed, and may be smaller and low in weight as they may be enclosed within a channel peripheral to the opening in the body and covered by the closure panel. However, the lever mechanism is substantially more complex. As a result, both of these systems are costly to produce, especially since many of the car models require changes in the width, length, and interactive arrangement of the parts to fit various vehicle closure panels and their related body openings. Moreover, the four bar systems may reduce the width of the access opening to the interior of the body in much the same way that the gooseneck bars restrict the trunk chamber, although the restriction is limited when the four bar system can be configured and mounted in the channel.

As a result, there is little interchangeability between the hinge components used on one model of vehicle compared to another model since the gooseneck bars or the complex linkages are particularly designed for displacing closure panels in a limited manner with respect to a particular body styling. Each different car model requires a unique hinge structure employed only with that particular model, and a plurality of hinge structures must be provided by vehicle manufacturers or suppliers.

In addition, the gooseneck hinges, and to a lesser extent, the four bar and six bar hinges, allow the closure panel at hinge side to be pushed off the trunk seal by an obstructive load within the compartment defined by the vehicle body. For example, a stuffed trunk of the motor vehicle may allow the deck lid tips at the adjoining edge of the body opening to lift above the adjacent body panel. When the closure panel is forced upwardly from the seal, ambient weather conditions can enter the compartment and damage the load. This unsealing is due to the cantilever nature of the gooseneck hinge and movement of links about the parallel axes in the conventional multi-bar hinge.

In addition, the previously known cantilever and complex linkage mountings often introduce substantial tolerances that can adversely affect lateral stability and sideways tracking of the closure panel with respect to the body opening, particularly where the closure panel is displaced to an open position away from the body opening. A previous patent application for a three axis hinge that was compact and mounted in a peripheral channel extending about a vehicle opening, but that has not been commercialized, also taught that instability in the closed position could be resisted by maintaining a particular alignment between the axes when the lid was in a closed position.

DISCLOSURE OF INVENTION

The present invention overcomes the above-mentioned disadvantages by providing a concealed hinge structure that does not interfere with vehicle compartments and does not cause interference with other vehicle body panels during displacement to or from either a closed position or an open position. The hinge structure is substantially simpler and occupies less space than many previously known hinge structures and improves the lateral stability of the closure panel by using at least one hinge set, but preferably a pair of hinge sets, each hinge set including three pivot axes, and a lid displacement limiter. The pivot axes of each set are aligned to intersect each set at a single point, and preferably positioned to control displacement of the panel in a non-interfering path with respect to adjacent portions of the body. In addition, the hinge set folds to a compact shape and can be mounted within a body channel, at the periphery of a portion of the body opening, to reduce obstruction of the useful space. Moreover, the hinge set structure is aligned for maintaining a precise position when the panel is closed, as well as when the panel is open and the lid displacement limiter restricts the alignment of the hinge set axes. As a result, the structure positively engages the closure panel against the closure seal around the body opening in the closed position, even when the load exerts pressure against the closure panel, and avoids excessive opening of the hinge that could render the lid position unstable.

Each hinge set generally comprises a panel mount defining a first pivot axis, a body mount defining a second pivot axis, and a first link and a second link pivotally secured to each other about a third axis. One of the first and second links is pivotally secured to the panel mount about the first axis, and the other of the first and second links is pivotally secured to the body mount about the second axis. Each of the first, second and third axes are aligned to intersect at a common subpoint, and the subpoint is positioned to locate the hinge axis to align said panel for movement on a non-interfering path with respect to body portions adjacent the path throughout a limited range of movement. A virtual pivot axis is possible at a location that a physical pivot might not be otherwise supported. Preferably, the common point is external to the body opening, and preferably outside, for example, forward of the trunk lid, of the opening. Closure of the hinge against a seal and restriction of lateral movement of the panel during displacement are improved when a first plane defined by the first and third axis and a second plane defined by the second and third axes remain at an acute angle when the panel is in a closed position.

Stability is improved in a fully open position of the closure and within a limited range of movement by maintaining an acute angle between the first and second planes with a displacement limiter. The planes may be easily identified when plates are used to form the links and to support journals for the hinge axes at the ends of the links. In such an embodiment, the displacement limiter may be conveniently provided by upstop edges on adjacent hinge plates that abut when the planes are aligned at an acute angle desired.

Nevertheless, rods may also be configured to include ends that are aligned along at least one of the hinge axes. When one rod includes two ends aligned with axes for pivotal displacement of each end with respect to adjacent components of the hinge, the construction of the hinge is substantially simplified. In such a case, or whenever the hinge components may not be readily modified to support displacement limiter components, displacement may be limited by other structures restricting displacement beyond the limited range by engagement with the closure panel itself. For example, a gooseneck arm secured to the panel may be biased toward an open panel position and against an abutment surface by a spring, for example, a torsion rod. In either event, the replacement of links with links of different sizes and axes alignments can adapt the assembly for use with a wide variety of vehicle body styles without changing the interaction of the hinge components and the displacement limiter. Moreover, these simple exchanges can modify the assembly to adapt the displacement of the closure panel with respect to many style features or accessory options for the vehicle body.

As a result, the present invention provides stability to a closure panel assembly with a compact hinge structure that provides interchangeability and commonality of hinge parts between different body styles of vehicles. In addition, the hinge structure folds compactly and operates in a restricted displacement zone from a mounting within a limited body area that limits obstruction to access and the interior space of the vehicle body covered by the closure panel. The assembly also resists the force of a compressed load tending to raise the closure panel away from the body seal and reduces instability of the closure panel in the open position. In addition, simple hinge components can be used with a variety of links in order to accommodate a wide range of vehicle styles. Moreover, the present invention provides a vehicle closure assembly with greater lateral stability in both open and closed positions and provides alignments between the components that improve the stability throughout the restricted displacement zone.

BRIEF DESCRIPTION OF DRAWINGS

The present invention will be more clearly understood by reference to the following detailed description of a preferred embodiment when read in conjunction with the accompanying drawing in which like reference characters refer to like parts throughout the views and in which:

FIG. 3 is an enlarged, fragmentary, perspective view taken substantially along the view line 3 in FIG. 2;

FIG. 3a is an enlarged perspective view of a telescoping device 34 shown in FIG. 3;

FIG. 3b is an enlarged, fragmentary perspective view of a portion of the telescoping device shown in FIG. 3a;

FIG. 3c is an enlarged perspective view of a mounting for the torsion rod shown in FIG. 3;

BEST MODE FOR CARRYING OUT THE INVENTION

Figure 1:
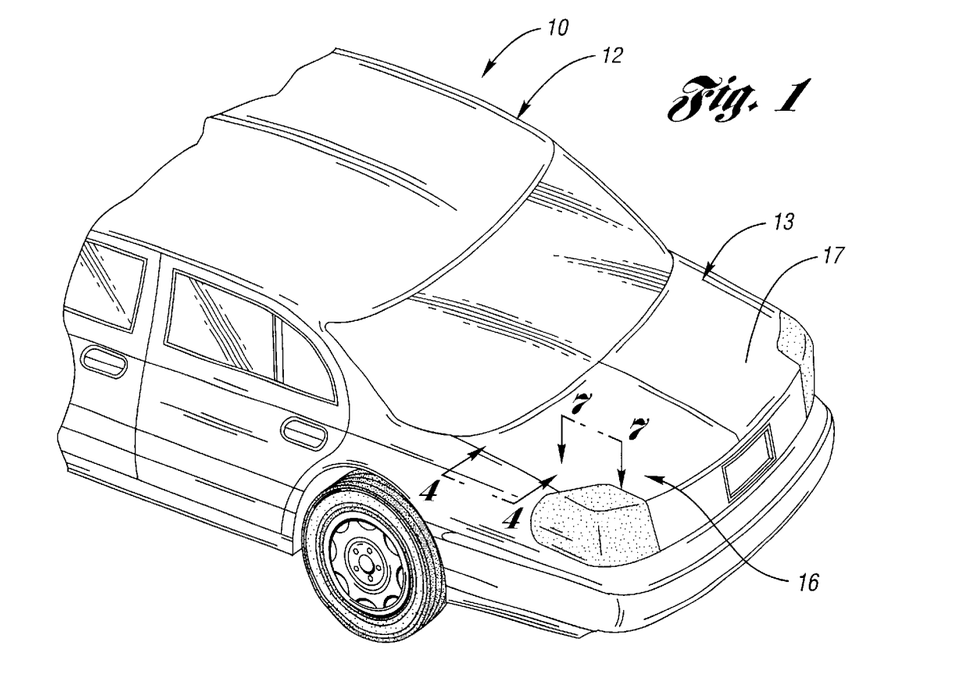
FIG. 1 is a perspective view of a vehicle with a closure panel assembly with the panel located in its closed position with respect to a vehicle body opening and including a hinge and displacement limiter constructed according to the present invention.

Referring first to FIG. 1, a vehicle 10 includes a body 12 defining a closure assembly 13 with a body opening 14 (FIG. 2) and a closure panel 16 covering the body opening 14. In the preferred embodiment, the body opening 14 is a trunk access opening 15 for a trunk compartment 18 (FIG. 2) enclosed by a trunk lid 17. It is to be understood that references to the trunk opening and the trunk lid may be replaced by other openings and closure panels, such as door openings and doors, hood openings and hoods, and other vehicle apertures covered by a selectively opening closure panel, so that references to the body opening 14 and the closure panel 16 are to be given broad interpretations. The trunk lid 17 is shown in a closed position in FIG. 1.

Figure 2:
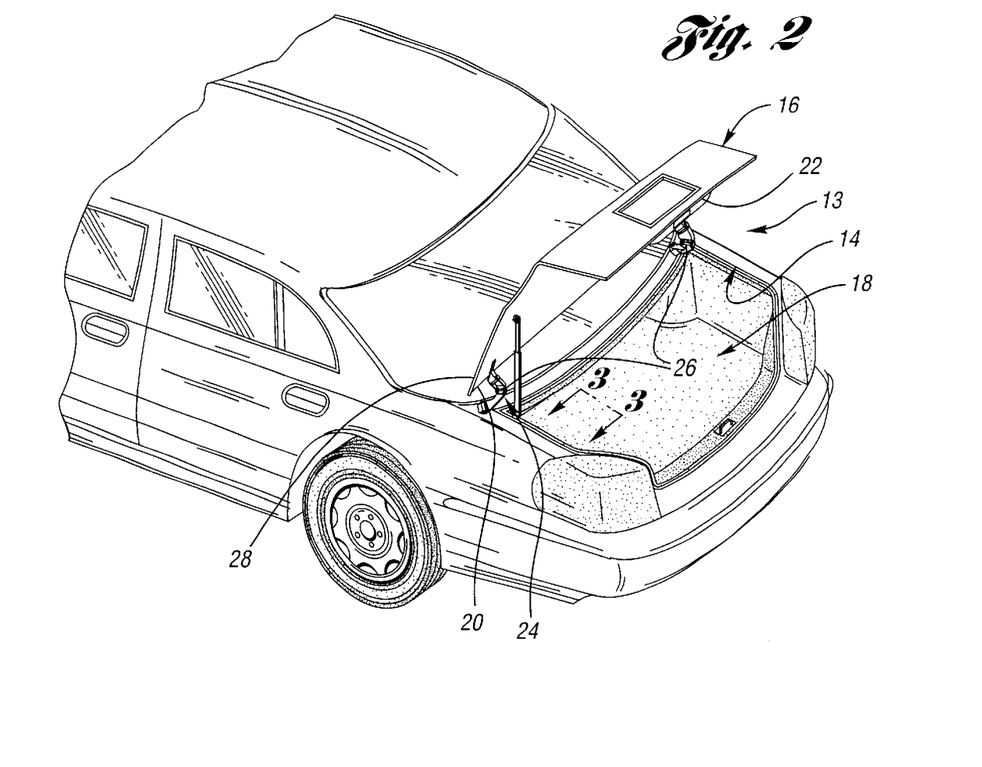
FIG. 2 is a perspective view similar to FIG. 1, but showing the closure panel in its open position.
Figures 3, 3A, 3B, 3C:
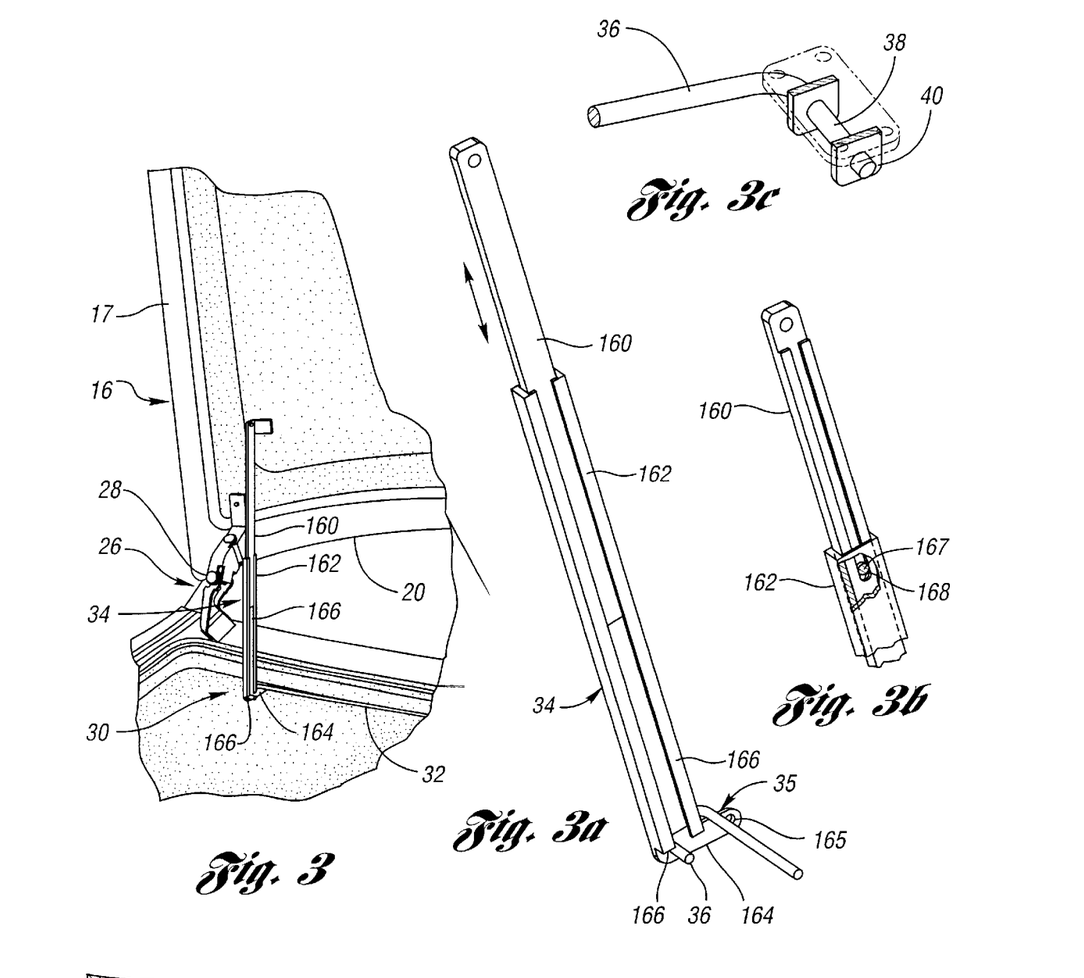

Referring now to FIGS. 2 and 3, the closure panel 16 has a hinge side 20 and a lock side 22 which provides the mechanisms for securing the closure panel 16 over the body opening 14 and selectively opening the panel. The hinge side 20 is secured by a hinge 24 comprising a pair of spaced hinge sets 26 to be discussed in greater detail below. The lock side includes a lock and latching mechanism (not shown) for selectively locking the trunk lid 17 in its closed position over the trunk 18.

As better shown in FIG. 3, the hinge sets 26 (one shown) control displacement of the trunk lid 17 or other closure panel 16 near the hinge side 20. The hinge sets 26 are preferably located near the points 28, the closure panel corners often most obstructed from free movement of the panel due to contouring of the panel to meet the body shape, curvatures of the panel, and interior hidden hinge axes. The assembly 13 mounts the sets 26 so that the points 28 are displaced without interference with adjacent body panels, without uncontrolled lateral displacement and without the sealing difficulty experienced by previously known hinge structures. The hinge sets 26 need not be redesigned in order to provide proper movement of the points and the position of the hinge cooperates with the structure of the hinge and the displacement limiter to alleviate displacement problems previously associated with the points 28, such as bottoming during movement in a path about the hinge axis.

In addition, the closure may be activated by displacement assisting devices that control the speed, the distance or strength of the panel movement, For example, an assistor 30 can be simply constructed as a telescoping device 34, When the device 34 is constructed as a torsion rod assisted slider 35, the torsion rod 32 pivots the to lid 17 upwardly to an open position. The return bent end of the torsion rod 32 imposes a biasing force on Me slider 35 as the other end of the torsion rod is attached to a support structure, for example, a body panel mounting bracket that retains a bent end of the torsion rod 32 in bracket openings as shown in FIG. 3c.

In the embodiment shown in FIGS. 1–9, the telescoping device 34 (FIG. 3a) is an up-stop slider in which an inner elongated member 160 is telescopically received in a channel member 162. A connecting link 164 extending from back wall may be pivotly mounted to a bracket mounted under the reinforcement channel or the rear shelf of the vehicle through an opening 165. Another opening 166 below the channel receives a returned bent end of the torsion rod. The slider inner member 160 slides longitudinally along the channel of the channel member 162 until an abutment protrusion 167 on the inner wall of the channel mates with step 168 formed on the inner member 160. Abutment of the protrusion 167 against the step 168 limits the extension of the inner member 160 from the outer member 162 to limit the opening position of the lid 17, Alternatively, a telescoping device 34 may be a cylinder housing secured to the lid 17 that receives a plunger end, and adjusts for the change in length of the spring end from the spring mount as the panel 16 travels its hinge path. Preferably, the cylinder carries a piston attached to the plunger end of the torsion rod 32. The cylinder may also be of the type that includes biasing, for example, gas or viscous pressure, to limit the speed and the force at which the panel 16 is twisted open as the plunger end moves toward an end of the cylinder or retreats into the cylinder. Such cylinders may inherently include structures, that limit the length of extension, that may be relied upon to limit the open and the closed positions without redesign. The piston may be retained between the ends of the cylinder by an abutment surface, for example, an annular collar, that restricts withdrawal of the piston and limits displacement of the lid and thus, the range of hinge opening.

The movement is also controlled by twisting in the end portion 36 of the torsion spring 32. Of course, other spring mechanisms can be used with the hinge structure 24 of the present invention, but the torsion spring 32 provides a simple structure that saves space and weight in the vehicle body and improves the available access area at the opening 14 as well as the storage space available within the compartment that is exposed to the access opening 14. Torque is built up in the leg 36 by a retained end 38 (FIG. 3c) which is bent to conform with the body structure at the periphery of the access opening 14 and for engagement with locking tabs 40 tat prevent rotation of the end 38 around the axis of the leg 36 to spring bias the lid 17 upwardly toward its open position.

Figure 4:
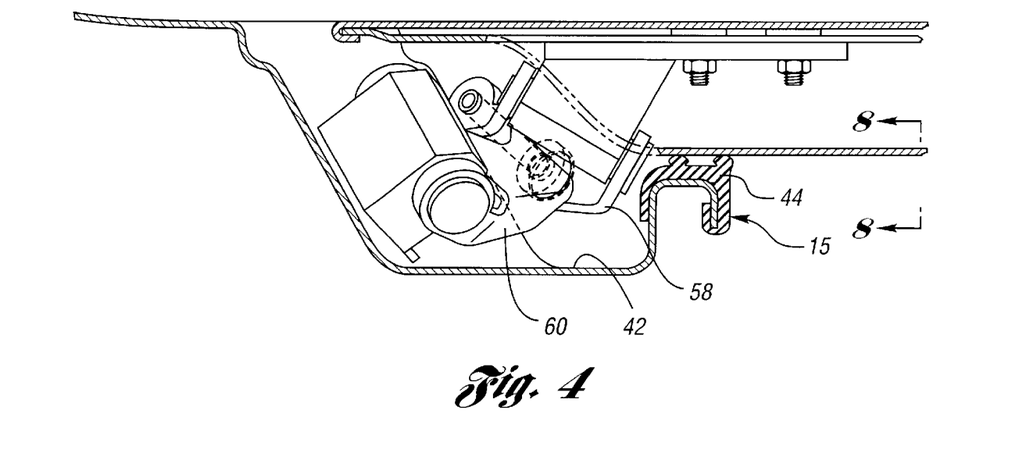
FIG. 4 is a sectional view taken substantially along the lines 4—4 in FIG. 1.

As also shown in FIGS. 3 and 4, the assembly may include the trunk opening 15 that is peripherally defined by body structure channel 42 that adds rigidity to the edge of the body surrounding the trunk opening 15. As shown in FIGS. 3–6, a wall of the channel carries a compressible sealing strip 44 that compliantly engages a surface of the trunk lid 17 when the trunk lid is in its fully closed position. Preferably, the hinge set 26 is mounted in the channel 42 and is wholly received within the channel 42 when the trunk lid 17 is in its closed position.

Figures 5, 6:
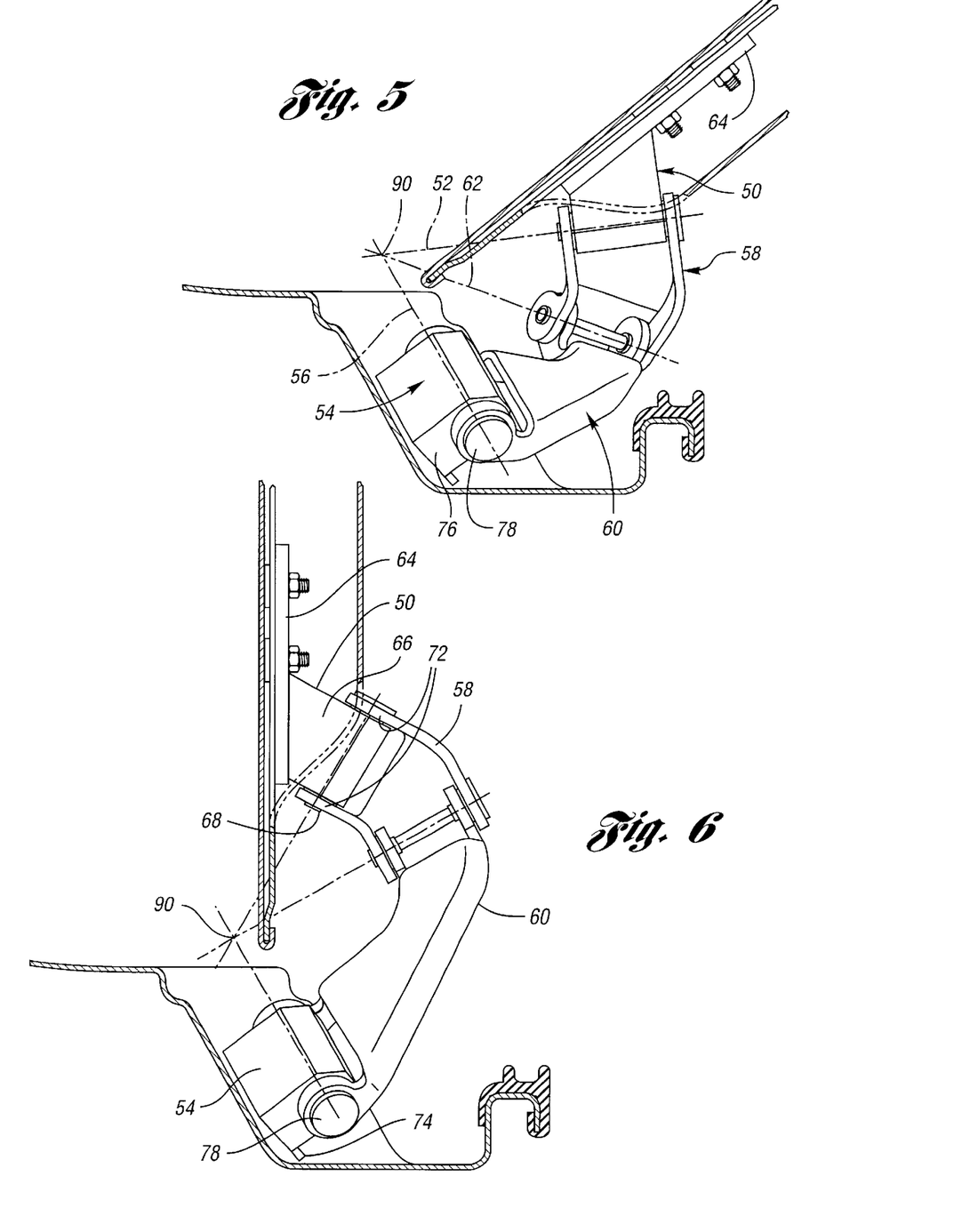
FIG. 5 is a view similar to FIG. 4, but showing the closure panel in an intermediate opening position.
FIG. 6 is a view similar to FIGS. 4 and 5, but showing the closure panel in a fully open position.

Each hinge set 26 includes a panel mount 50 defining a first pivot axis 52 (FIG. 5). A body mount 54 defines another pivot axis 56. A link 58 is pivotally secured to a link 60 (FIG. 5) about a pivot axis 62 (FIG. 5). One link 58 is pivotally joined to the lid mount 50 about the axis 52 (FIG. 5), while the other link 60 is pivotally secured to the body mount 54 about the axis 56 to form each hinge set 26.

In the embodiment shown in FIGS. 3–9, a panel mount 50 comprises a bracket having a mounting flange 64 and a pin support flange 66. The support flange 66 carries a pivot pin 68 received in a bore of a pivot portion 70 (FIG. 8), preferably formed by a yoke of flanges 72 (FIG. 6) at an end of the link 58. The yoke may include bushings. As best shown in FIG. 6, at the junction between links 58 and 60, the flanges on the link 60 extending inwardly adjacent to the outer flanges of the link 58 include bushings inserted so that an enlarged head of the bushing extends between the flanges. A smaller end of the bushing, protruding from the inner edge of the inner flanges on the link 60, may then be peened or otherwise locked into position outside the flange. As a result, the bushing avoids excessive wear between the flanges of the adjacent links 58 and 60 as well as providing reduced wear due the pivoting displacement of the link 60 about the pivot pin extending through the overlapping flanges.

Figure 8:
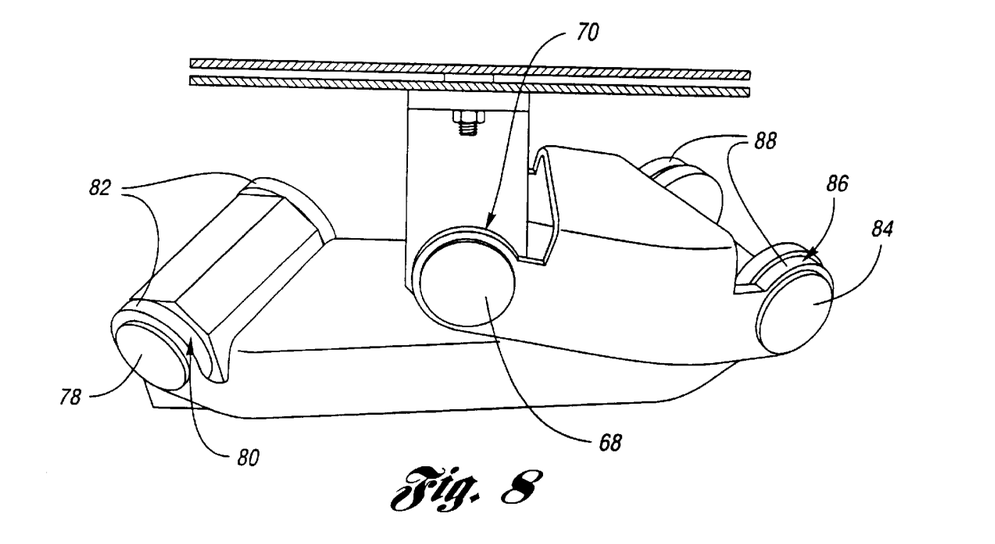
FIG. 8 is a sectional view taken substantially along the line 8—8 in FIG. 4.
Figure 9:
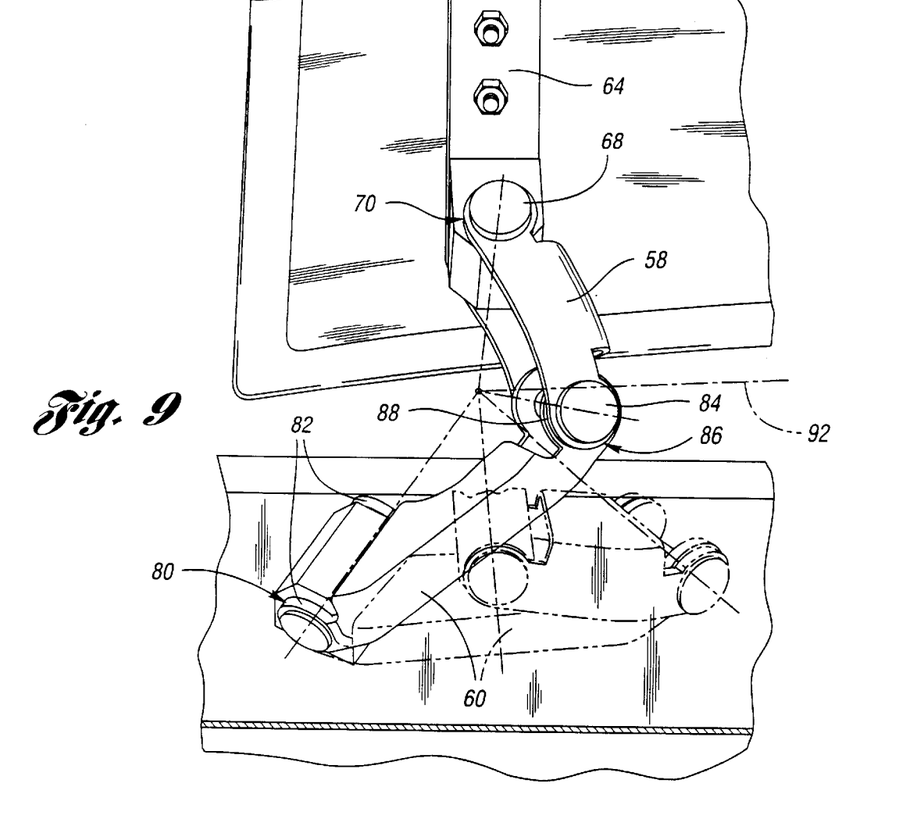
FIG. 9 is a rear view of the hinge mechanism shown in FIG. 6.

Similarly, the body mount 54 includes a mounting flange 74 (FIG. 6) and a pin support flange 76 carrying a pin 78 aligned along axis 56. The pin 78 is carried in a pivot portion 80 (FIG. 8) formed by spaced flanges 82 (FIG. 9) as discussed above for the similar journal 70. Similarly, one of the links 58 and 60 supports pivot pin 84 aligned along axis 62 and the other one of links 58 and 60 includes a journal 86 (FIG. 9), for example, formed by spaced flanges 88 (FIG. 8).

In the preferred embodiment shown in FIGS. 3–9, each of the links 58 and 60 is formed of a thick metal plate, although other constructions of the links are possible, as will be discussed in greater detail below.

Figure 7:
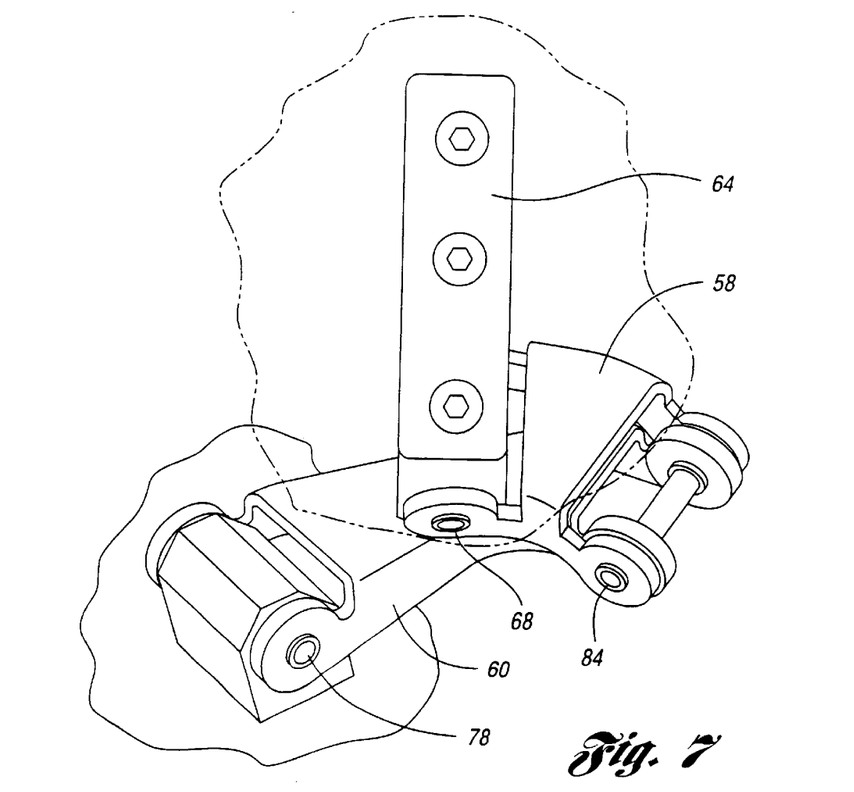
FIG. 7 is a view taken substantially in the view direction 7 shown in FIG. 1 with parts removed for the sake of clarity.

As shown in FIGS. 5–8, the body mounted flange 74 is secured to a substantially vertical, inward wall portion of the channel 42 although other sides or the bottom might be used for attachment. The mounting flange 74 can be secured by bolts, welds, or the like so that the pivot axis 56 extends in the direction exteriorly of the trunk cavity and the trunk lid 17 toward a point 90 at which the axis 56 intersects the axes 52 and 62. In addition, the intersection point 90 for the right hinge set 26 is laterally spaced from the intersection point 90 of the left hinge set 26, defining a virtual hinge axis 92 (FIG. 9) extending through the intersection points 90, As best shown in FIG. 4, when the lid 17 is in its closed position, the plates forming the links 58 and 60 are aligned substantially upright to add lateral stability to the lid structure. In particular, as shown in FIGS. 4 and 7 the plane defined by the axes 52 (FIG. 5) and 62 (FIG. 5) and the plane defined by the axes 56 (FIG. 5) and 62 (FIG. 5) intersect at an acute angle to avoid approaching parallel or nearly planar hinge axis alignments of more than one axis.

Figure 10:
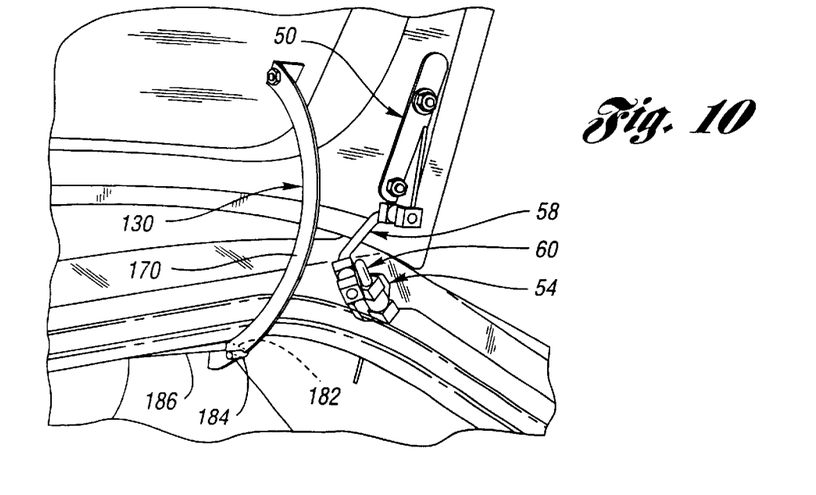
FIG. 10 is a perspective view similar to FIG. 9 of a right hand hinge set showing a modified assembly structure according to the present invention.
Figure 11:
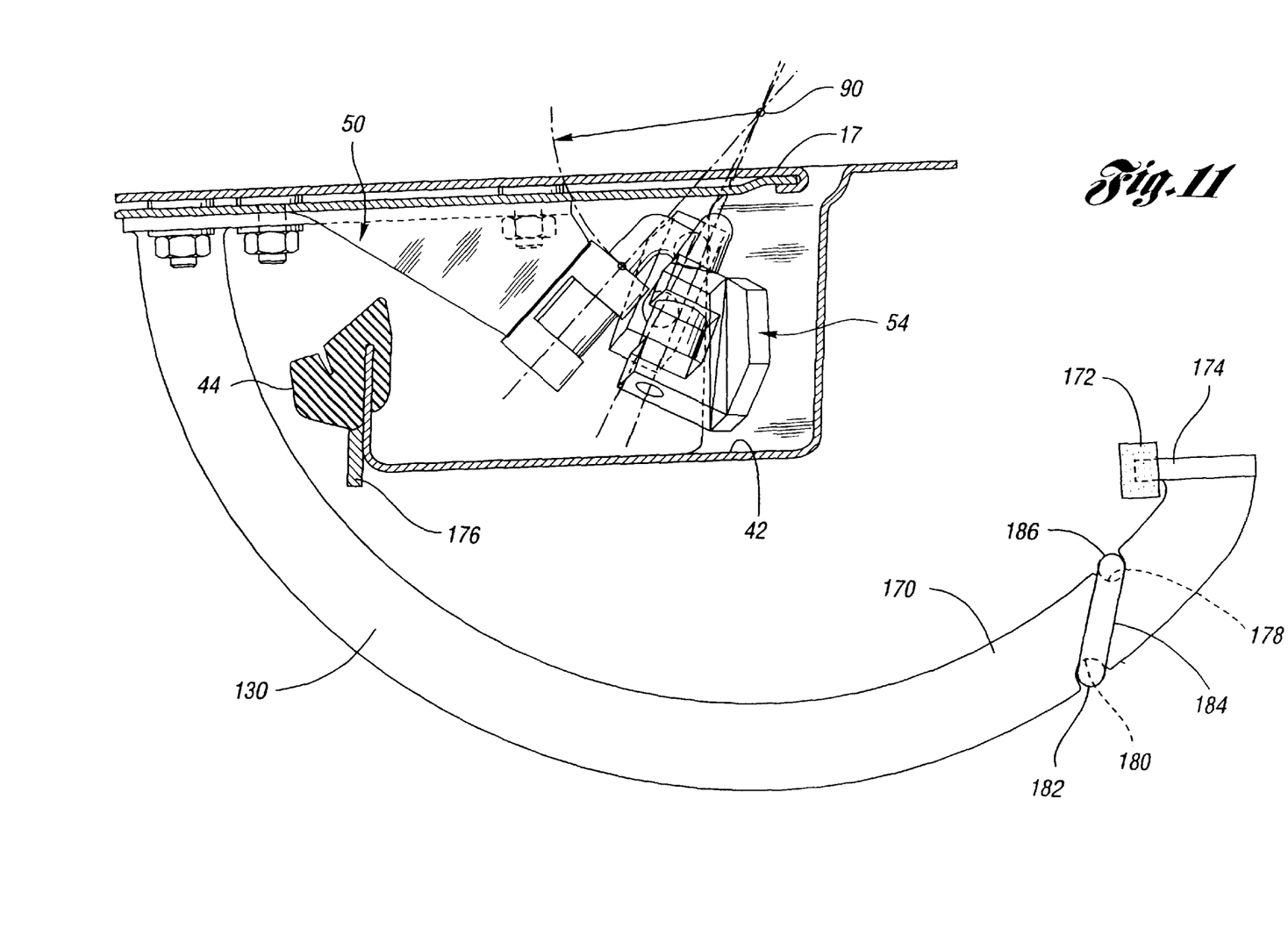
FIG. 11 is a view similar to FIG. 4, but showing the modified hinge structure of FIG. 10.
Figure 12:
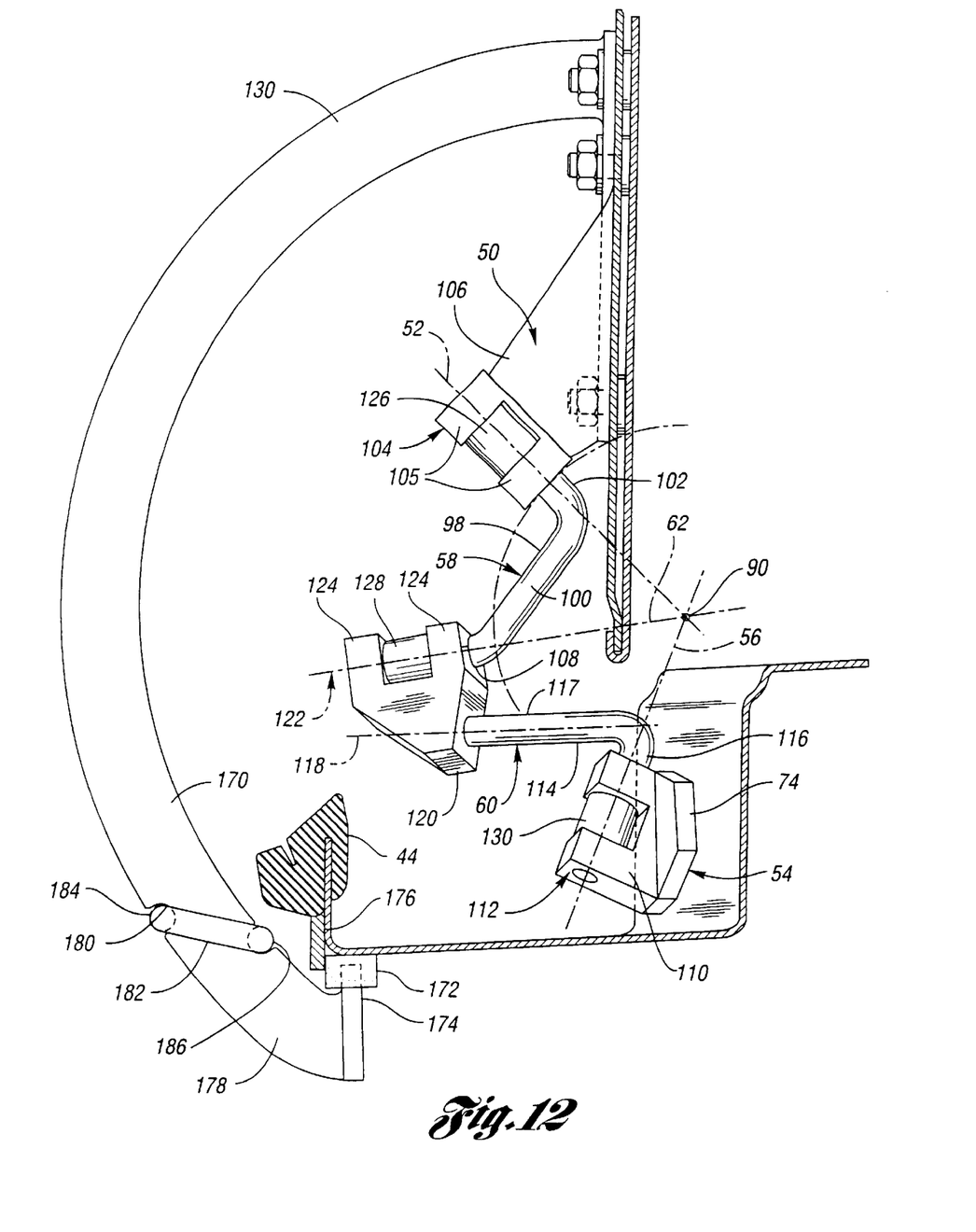
FIG. 12 is a view similar to FIG. 6, but showing the hinge structure of FIGS. 10 and 11 in an open position.

An alternative hinge and displacement limiter structure is shown in FIGS. 10–12 where the links 58 and 60 are formed with rods. The rods render the hinge structure more compact and lighter in weight than alternative embodiments, and ends of the links can be used to form the pivot pins aligned along the intersecting axes. The link 58 is formed of a bent rod 98 (FIG. 12) having a center strand 100 coupled by a bend to an end 102 forming a pin along the axis 52. The pin 102 is received in a journal 104 formed by spaced apart sleeves 105 on a support flange 106 of the panel mount 50. One of the rods 98 and 114 is pivoted with respect to the other along the axis 62 as in the other embodiment.

The body mount 54 includes a mounting flange 74 and a journal support flange 110 supporting a journal 112 for receiving a pivot pin. The link 60 is formed by a rod 114 with an end leg 116 received in the journal 112 along the axis 56. A bend in the rod 114 couples the end 116 to an end 117 aligned along an axis 118 which is preferably in the plane of the axes 56 and 62. A mounting block 120 is secured to the end 117 of the rod 114.

In the alternative embodiment shown in FIGS. 10–12, the end 117 of the rod 114 is non-rotatably held in block 120 along the axis 118. The other end of block 120 includes a bearing block 122, for example, a bearing block formed by spaced sleeves 124. The bearing block 122 is aligned on the axis 62 to receive the end 108 of the rod 98 so that the rod forms a pivot pin in the bore of the bearing block 122. Each pin formed as a rod end 102, 108 and 116 is retained in their respective journal by a compression sleeve 126, 128 and 130, respectively, positioned between the spaced sleeves of the respective journal. The simplified structure substantially reduces packaging requirements. As in the previously discussed embodiment, the planes formed by the axes 56 and 62 intersects the plane formed by the axes 62 and 52 at an acute angle. Moreover, the compact space-saving arrangement using rods permits a substantially narrower or shallower channel 42 around the body opening and further reduces restriction of the space in the trunk compartment 18 and the access opening 15 to the trunk.

The embodiment shown in FIGS. 10–12 also includes a displacement restricter in the form of a gooseneck arm 130. Preferably, the gooseneck arm is shorter and substantially less robust than previously known gooseneck hinge arms that must support the lid in the open and closed positions. The torsion rod 132 has a return bent portion 134 that resiliently urges the compact gooseneck arm 130 to a raised position so that the mounting tab 136 at an end of the gooseneck arm 130 raises the lid 17 to which it is attached so as to raise the panel 16 from the closed position as shown in FIG. 11 to the open position shown in FIG. 12.

As shown in FIGS. 10–12, a flat arcuate arm 170 may be bent away from the plane of the mounting tab 136 and formed from a metal plate such as a stamping. The other end of the arm 170 includes a hook 172 that receives a bumper 174. The bumpered hook is displaced along a path that permits it to engage an upstop protrusion 176 depending from the structure defining the channel 42 and, preferably, near the seal. The arcuate path followed by the arcuate arm 170 is concentric with the radius of curvature. The center point of the radius is preferably coincident to the virtual pivot point so as to limit the length of the gooseneck arm 130 and its obstruction of the space within the vehicle opening 15 and the vehicle cavity. The arm 170 includes recesses 178 and 180 adapted to receive the torque rod leg 184 and the return bent arm 182 respectively, of the torsion rod 186. The torsion rod may be mounted in a manner similar to that shown in the torsion rod mounting previously discussed. Intermediate the end mounting flange 136 and the stop end 138, the compact gooseneck arm 134 has a curvature, preferably with a radius whose center of curvature is at the virtual pivot point 90. Morever, the bumpered hook 172 resiliently engages the up-stop 176 to limit the open position of the lid 17 and restrict the displacement of the hinge set 26 to a position at which all three axes 52, 56 and 62 cannot be aligned in the same plane. The shortened gooseneck arm 130 is mounted so that, as a result, the planes defined by the axes maintain an angular position and thus resist lateral movement of the panel between and at the opened and closed positions.

Figure 13:
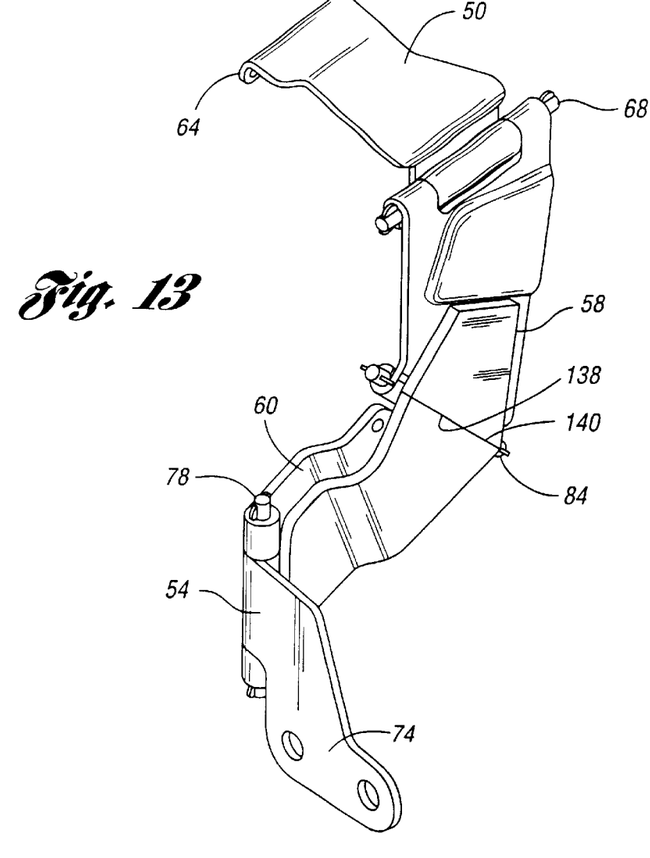
FIG. 13 is a perspective view of a modified hinge structure according to the present invention showing the hinge in a expanded or open position.
Figure 14:
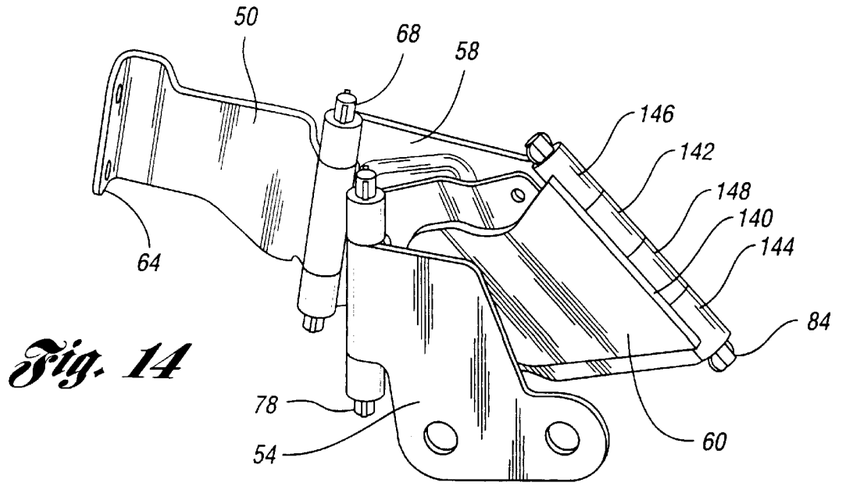
FIG. 14 is a perspective view of a hinge shown in FIG. 13 but showing the hinge in retracted or closed position.

Referring now to FIGS. 13 and 14, modified hinge sets 26 are shown in which the displacement limiter is formed as part of the hinge. In the illustrated embodiment, the intermediate hinge links 58 and 60 formed by brackets that include abutment ridges 138 and 140, respectively, that engage each other and limit rotation about the hinge pin 84 as the hinge set moves from its folded to its expanded position. For example, as best shown in FIG. 14, spaced sleeves 142 and 144 may be interleaved with spaced sleeves 146 and 148 carried by the link 58 and aligned to receive the pivot pin 84. The abutment surfaces may be formed with or added to the links 58 and 60 by welding, forging or other metal forming techniques or separately fabricated as stop blocks that are secured to the brackets. In any event, the brackets form a displacement limiter within the hinge itself which prevents unstable planar alignment of the hinge axes 56, 62 and 52.

In the illustrated embodiments, the pivot axes remain aligned to intersect at common point 90 exteriorly of the body opening, and preferably outwardly of the opening away from the hinge side of the closure panel. Each embodiment of the hinge provides a stable hinge arrangement with a simplified structure for reducing obstruction to access and the load space within a vehicle. In addition, the present invention provides stability during displacement of the closure panel 16 as well as at the open and closed positions. In addition, the hinge axis can be positioned above and outwardly of the body opening so that close-fitting pieces, such as the points 28 of the trunk lid 17, can be displaced without obstructing adjacent portions of the body despite the application of panel contours and edge contours for styling purposes. In addition, the displacement assistance devices can be used as part of the displacement limiter.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle closure assembly for pivotally mounting a closure lid over a body opening for displacement between a closed position in registration with said opening and an open position displaced exteriorly of said opening, the hinge comprising at least one hinge set, each set comprising;

a panel mount defining a first pivot axis;

a body mount defining a second pivot axis;

a first link;

a second link pivotally secured to the first link about a third axis, one of said first and second links being pivotally secured to said panel mount about said first axis, and the other of said first and second links being pivotally secured to said body mount about said second axis;

wherein each of said first, second and third axes aligned to intersect at a common set point, the common set point aligning said panel in a non-interfering path with respect to body portions adjacent to the path; and a displacement limiter stop configuring a first plane, defined by said first and third axes, with respect to a second plane, defined by said second and said third axes, to remain at an acute angle in said open position.

2. The invention as defined in claim 1 and further comprising an arrangement wherein said first plane and said second plane are aligned at an acute angle at said closed position.

3. The invention as defined in claim 1 wherein said hinge comprises at least two hinge sets, a first said set having a first common set point, a second said set having a second common set point, said first and second common set points being linearly spaced to define a virtual hinge axis.

4. The invention as defined in claim 2 wherein said virtual hinge axis is positioned outwardly from an edge of said body opening.

5. The invention as defined in claim 2 wherein said virtual hinge axis is external to said body panel opening.

6. The invention as defined in claim 1 wherein said body opening is peripherally defined by a channel section in said body and wherein said body mount is carried in said channel.

7. The invention as defined in claim 1 wherein said first and second planes are substantially aligned with the direction of displacement from said closed position when in said closed position.

8. The invention as defined in claim 1 wherein said acute angle is in the range of 10° to 45°.

9. The invention as defined in claim 1 wherein said first and second links are plates.

10. The invention as defined in claim 1 wherein each of said first and second links is a rod.

11. The invention as defined in claim 10 wherein said one link includes a first end aligned along said first axis and a second end aligned along said third axis.

12. The invention as defined in claim 10 wherein said link mount comprises a pivot portion with a bore pivotally receiving said first end of said first link.

13. The invention as defined in claim 12 wherein said pivot portion comprises a yoke.

14. The invention as defined in claim 10 wherein said first rod includes a first end aligned along one of said first, second and third axes, and said second rod includes a first end aligned along another of said first, second and third axes.

15. The invention as defined in claim 14 wherein one of said first and second rods has a second end aligned along another of said first, second and third ends and said ends of said one rod form pivot pins.

16. The invention as defined in claim 10 wherein at least one end of one said rod is pivotally received in a pivot portion in one of said panel mount and said body mount.

17. The invention as defined in claim 16 wherein said pivot portion comprises a yoke and a compression bushing.

18. A vehicle closure comprising:

a closure panel dimensioned to fit a body opening, and first and second hinge sets pivotally mounting said panel to the body defining the opening;

said body including a channel peripheral to at least a part of said body opening, each of said first and second hinge sets including a body mount in said channel, said body mount defining a first hinge axis;

a panel mount defining a second hinge axis; and a pair of links pivotally coupled about a third axis, one of said links being coupled pivotally about said first hinge axis to said body mount and the other of said links pivotally coupled about said second axis to said panel mount;

said first, second and third hinge axes intersecting at a common point, the point positioned to align said panel for movement in a non-interfering path with respect to body portions adjacent to the path;

wherein said axes are aligned to position said links in said channel in said closed position; and a displacement limiter stop configuring a first plane, defined by said first and third axes, with respect to a second plane, defined by said second and said third axes, to remain at an acute angle at said open position.

19. The invention as defined in claim 18 wherein said point of said first hinge set is linearly spaced from said point of said second hinge set to define a virtual pivot axis externally of said body opening.

20. The invention as defined in claim 19 wherein said virtual hinge axis is outwardly spaced from said opening.

21. The invention as defined in claim 18 and further comprising a displacement assistor.

22. The invention as described in claim 21 wherein said displacement limiter comprises an end of travel restricter on said displacement assister.

23. The invention as defined in claim 21 wherein said assistor comprises a torsion bar and a gooseneck arm resiliently engaged by said torsion bar.

* * * * *